US012584422B1

(12) United States Patent
Noiseux et al.

(10) Patent No.: US 12,584,422 B1
(45) Date of Patent: Mar. 24, 2026

(54) SYSTEM AND METHOD FOR ASSEMBLING A ROTATIONAL EQUIPMENT ASSEMBLY OF AN AIRCRAFT PROPULSION SYSTEM

(71) Applicant: Pratt & Whitney Canada Corp., Longueuil (CA)

(72) Inventors: Danny Noiseux, Longueuil (CA); Valentin Andronache, Longueuil (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/944,910

(22) Filed: Nov. 12, 2024

(51) Int. Cl.
*F01D 25/28* (2006.01)
*B64F 5/10* (2017.01)

(52) U.S. Cl.
CPC .............. *F01D 25/285* (2013.01); *B64F 5/10* (2017.01); *F05D 2220/323* (2013.01); *F05D 2230/64* (2013.01)

(58) Field of Classification Search
CPC ....... F01D 25/285; B64F 5/10; F05D 2230/64
See application file for complete search history.

(56) References Cited

U.S. PATENT DOCUMENTS

| | | | | |
|---|---|---|---|---|
| 5,127,797 | A * | 7/1992 | Carman | F01D 25/285 |
| | | | | 415/209.2 |
| 6,279,309 | B1 * | 8/2001 | Lawlor | F01D 25/285 |
| | | | | 60/39.35 |
| 7,735,363 | B2 * | 6/2010 | Mainville | F01D 21/003 |
| | | | | 73/116.03 |

| | | | | |
|---|---|---|---|---|
| 9,976,443 | B2 | 5/2018 | Coffin | |
| 10,844,787 | B2 | 11/2020 | Hanrahan | |
| 11,719,283 | B2 | 8/2023 | Hartnagel | |
| 11,807,398 | B2 | 11/2023 | Henriksen | |
| 2009/0288291 | A1 * | 11/2009 | Ziekow | F04D 17/125 |
| | | | | 415/232 |
| 2013/0199038 | A1 * | 8/2013 | Beeck | F01D 25/285 |
| | | | | 29/888.3 |
| 2015/0184545 | A1 * | 7/2015 | Floter | F01D 25/285 |
| | | | | 29/889.21 |
| 2017/0145862 | A1 * | 5/2017 | Reinhardt | F01D 25/285 |
| 2022/0073215 | A1 * | 3/2022 | Le Gall | B64F 5/50 |
| 2022/0373183 | A1 * | 11/2022 | Higuchi | F01D 25/243 |
| 2023/0022776 | A1 * | 1/2023 | Batt | F01D 25/285 |
| 2023/0167753 | A1 * | 6/2023 | Porco | B64F 5/50 |
| | | | | 29/889.1 |

(Continued)

FOREIGN PATENT DOCUMENTS

| | | |
|---|---|---|
| CN | 113756875 B | 11/2023 |
| CN | 117657929 A | 3/2024 |

*Primary Examiner* — Kyle A Cook
(74) *Attorney, Agent, or Firm* — Getz Balich LLC

(57) ABSTRACT

A method for assembling a rotational equipment assembly having a rotational equipment module and a rotational equipment case includes axially supporting the rotational equipment module with a first support assembly, positionally fixing a rotor assembly and a stator assembly of the rotational equipment module together with a second support assembly, coupling a pulling rod assembly with a tooling shaft of the rotational equipment module, and assembling the rotational equipment assembly by positioning the rotational equipment case axially abutting the rotational equipment module and axially pulling the pulling rod assembly to axially fit the rotational equipment module with the rotational equipment case.

7 Claims, 14 Drawing Sheets

(56) References Cited

U.S. PATENT DOCUMENTS

| | | | | |
|---|---|---|---|---|
| 2023/0203965 A1* | 6/2023 | Massicotte | .............. | F01D 25/28 |
| | | | | 415/213.1 |
| 2023/0373069 A1 | 11/2023 | Noiseux | | |
| 2024/0035799 A1* | 2/2024 | Malczenko | ........... | F01D 25/168 |
| 2024/0149414 A1 | 5/2024 | Boissonneault | | |
| 2024/0157528 A1* | 5/2024 | Jackson | ............... | B25B 27/062 |

* cited by examiner

SYSTEM AND METHOD FOR ASSEMBLING A ROTATIONAL EQUIPMENT ASSEMBLY OF AN AIRCRAFT PROPULSION SYSTEM

TECHNICAL FIELD

This disclosure relates to systems and methods for assembling a rotational equipment assembly of an aircraft propulsion system.

BACKGROUND OF THE ART

Rotational equipment, such as those typically found in an engine for an aircraft propulsion system, may typically include a plurality of rotational equipment components. For example, some rotational equipment components may be configured as modules including both rotor and stator components arranged together. Various tools, systems, and methods for facilitating assembly of these rotational equipment components are known in the art. While these known tools, systems, and methods may be suitable for their intended purposes, there is always room in the art for improvement.

SUMMARY

According to an aspect of the present disclosure, a method for assembling a rotational equipment assembly for an aircraft propulsion system is provided. The rotational equipment assembly includes a rotational equipment module and a rotational equipment case. The method includes axially supporting the rotational equipment module along an axis of the rotational equipment module with a first support assembly. The rotational equipment module includes a tooling shaft, a rotor assembly, and a stator assembly. The rotor assembly is mounted on the tooling shaft. The stator assembly circumscribes the rotor assembly. The rotor assembly and the stator assembly are seated on the first support assembly. The method further includes positionally fixing the rotor assembly and the stator assembly together with a second support assembly with the rotor assembly and the stator assembly axially supported by the first support assembly, the second support assembly mounted on the tooling shaft at a first axial end of the tooling shaft, coupling a pulling rod assembly with the tooling shaft at a second axial end of the tooling shaft, and assembling the rotational equipment assembly by positioning the rotational equipment case axially abutting the rotational equipment module and axially pulling the pulling rod assembly to axially fit the rotational equipment module with the rotational equipment case.

In any of the aspects or embodiments described above and herein, axially supporting the rotational equipment module may include lowering the rotational equipment module into the first support assembly along the axis until the rotor assembly and the stator assembly are seated on the first support assembly.

In any of the aspects or embodiments described above and herein, the first support assembly may include an upper support member and a lower support member, each of the upper support member and the lower support member may extend circumferentially about the axis, and with the rotor assembly and the stator assembly seated on the first support assembly the rotor assembly may be seated on the lower support member and the stator assembly may be seated on the upper support member.

In any of the aspects or embodiments described above and herein, positionally fixing the rotor assembly and the stator assembly together with the second support assembly may include axially fixing the stator assembly to the tooling shaft with the second support assembly.

In any of the aspects or embodiments described above and herein, positionally fixing the rotor assembly and the stator assembly together with the second support assembly may include rotationally fixing the second support assembly to the first support assembly.

In any of the aspects or embodiments described above and herein, coupling the pulling rod assembly with the tooling shaft at the second axial end may include axially fixing a coupling shaft of the pulling rod assembly to the tooling shaft at the second axial end.

In any of the aspects or embodiments described above and herein, coupling the pulling rod assembly with the tooling shaft at the second axial end may include coupling the pulling rod assembly with an outer race of a bearing of the rotational equipment module.

According to another aspect of the present disclosure, a system includes a rotational equipment module, a first support assembly, and a second support assembly. The rotational equipment module includes a tooling shaft, a rotor assembly, and a stator assembly extending along an axis of the rotational equipment module. The tooling shaft extends on and along the axis between and to a first axial end and a second axial end. The rotor assembly is mounted on the tooling shaft. The stator assembly circumscribes the rotor assembly. The first support assembly includes an upper support member and a lower support member. The upper support member and the lower support member extend circumferentially about the axis. The upper support member is coupled with the stator assembly. The lower support member is coupled with the rotor assembly. The second support assembly includes a coupling shaft, a frame, and a plurality of arms. The coupling shaft is coupled with the tooling shaft at the first axial end. The frame is mounted to the coupling shaft. The frame extends circumferentially about the axis and circumscribes the lower support member and the tooling shaft. The frame includes a ring. Each of the plurality of arms extends axially between and fixedly mounting the ring to the stator assembly.

In any of the aspects or embodiments described above and herein, the stator assembly may include a case extending circumferentially about the axis, the case may include a first flange, and the first flange may be disposed on the upper support member.

In any of the aspects or embodiments described above and herein, the rotational equipment module may include a bearing assembly on the tooling shaft at the second axial end, and the bearing assembly may be disposed on the lower support member.

In any of the aspects or embodiments described above and herein, the frame may be rotatable about the coupling shaft.

In any of the aspects or embodiments described above and herein, the stator assembly may include a flange, each of the plurality of arms may include a slot, and the flange may be disposed within the slot of each of the plurality of arms.

In any of the aspects or embodiments described above and herein, the second support assembly may be rotationally fixed to the first support assembly.

In any of the aspects or embodiments described above and herein, the system may further include a pulling rod assembly, the pulling rod assembly may include a second coupling shaft, a frame, and a plurality of finger links, the second coupling shaft may extend along the axis between and to a first axial shaft end and a second axial shaft end, the second axial shaft end may be mounted to the first axial end of the tooling shaft, the frame may be mounted on and axially moveable along the second coupling shaft, each of the plurality of finger links may be selectively attachable on the frame, and each of the plurality of finger links may include a hook.

In any of the aspects or embodiments described above and herein, the rotational equipment module may include a bearing, the bearing may include an inner race, an outer race, and a plurality of bearing elements between the inner race and the outer race, the inner race may be mounted on the rotor assembly, and the hook of each of the plurality of finger links may be engaged with the outer race.

According to another aspect of the present disclosure, a pulling rod assembly for assembling a rotational equipment assembly for an aircraft propulsion system includes a coupling shaft, a positioning nut, a frame, and a plurality of finger links. The coupling shaft extends on and along an axis between and to a first axial shaft end and a second axial shaft end. The coupling shaft forms a first threaded interface and a second threaded interface. The first threaded interface is disposed at the second axial shaft end. The second threaded interface is disposed between the first threaded interface and the first axial shaft end. The positioning nut extends circumferentially about the coupling shaft. The positioning nut includes a third threaded interface engaged with the second threaded interface. The frame extends circumferentially about the positioning nut. The frame forms a plurality of locking pin apertures. Each of the plurality of finger links extends axially between a first axial link end and a second axial link end. Each of the plurality of finger links includes a locking pin and a hook. The locking pin is disposed at the first axial link end and positioning within a respective one of the plurality of locking pin apertures. The hook is disposed at the second axial link end.

In any of the aspects or embodiments described above and herein, the positioning nut may be rotatable about the coupling shaft, with engagement between the third threaded interface and the second threaded interface, to axially move the frame along the coupling shaft.

In any of the aspects or embodiments described above and herein, the frame may include an outer radial end extending about the axis, and each of the plurality of finger links may extend along the outer radial end between the first axial link end and the second axial link end.

In any of the aspects or embodiments described above and herein, the pulling rod assembly may further include a thrust bearing mounted axially between and contacting the positioning nut and the frame.

In any of the aspects or embodiments described above and herein, the positioning nut may be axially and radially coincident with the frame.

According to another aspect of the present disclosure, a support assembly for assembling a rotational equipment assembly for an aircraft propulsion system includes a frame, an upper support member, and a lower support member. The frame includes a side wall portion and an end wall portion. The side wall portion and the end wall portion extend circumferentially about an axis of the support assembly. The side wall portion extends along the axis between and to a first axial side wall end and a second axial side wall end. The end wall portion includes an outer ring, an inner ring, and a plurality of arms. The outer ring is disposed at the second axial side wall end. The inner ring is disposed radially inward of the outer ring. The plurality of arms extends radially between and connecting the outer ring and the inner ring. The upper support member includes a support ring mounted on the side wall portion at the first axial side wall end. The support ring extends circumferentially about the axis. The support ring forms a first axial assembly end of the support assembly. The lower support member extends circumferentially about the axis. The lower support member is mounted on the inner ring. The lower support member forms an opening extending through the lower support member along the axis. The lower support member forms a second axial assembly end of the support assembly. The lower support member has a diameter which converges in an axial direction from the inner ring to the second axial assembly end.

According to another aspect of the present disclosure, a support assembly for assembling a rotational equipment assembly for an aircraft propulsion system includes a coupling shaft, an adjustment assembly, a frame, and a plurality of arms. The coupling shaft extends on and along an axis of the support assembly between and to a first axial shaft end and a second axial shaft end. The coupling shaft forms a threaded interface at the first axial shaft end. The adjustment assembly is mounted on the coupling shaft. The adjustment assembly is selectively rotatable about the coupling shaft. The frame extends circumferentially about the axis. The frame extends along the axis between and to a first axial frame end and a second axial frame end. The frame includes a ring at the first axial frame end. The second axial frame end is mounted to the adjustment assembly. The plurality of arms are circumferentially distributed about the axis. Each of the plurality of arms extends axially between a first arm end and a second arm end. The second arm end is mounted on the ring. Each of the plurality of arms forms a slot facing the axis.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
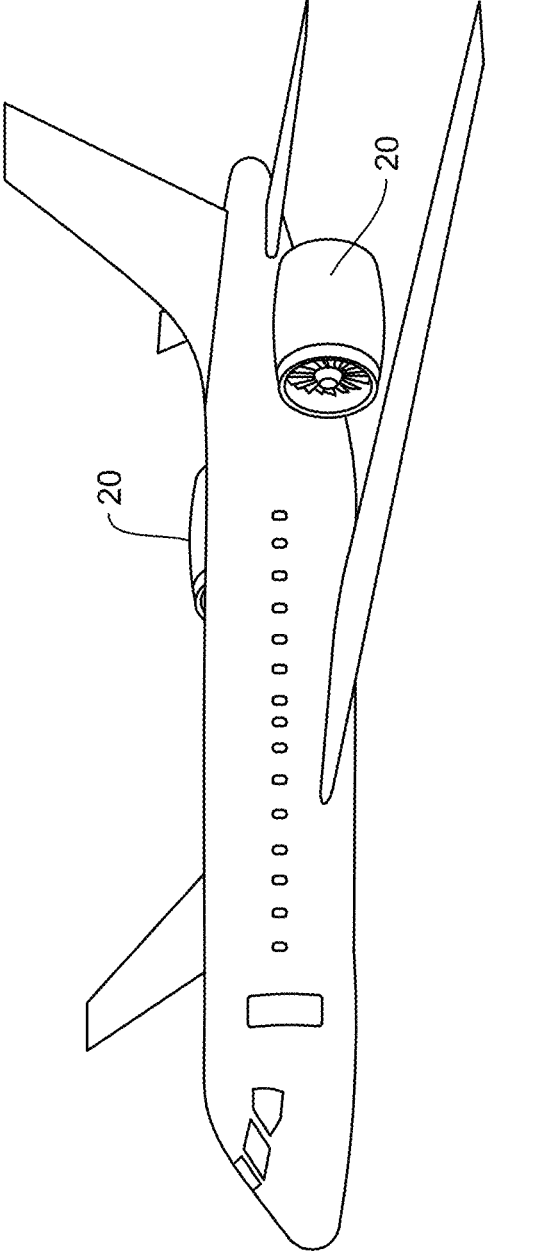
FIG. 1 illustrates an aircraft including a propulsion system, in accordance with one or more embodiments of the present disclosure.

FIG. 1 illustrates a propulsion system 20 for an aircraft. Briefly, the aircraft may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV, e.g., a drone).

Figure 2:
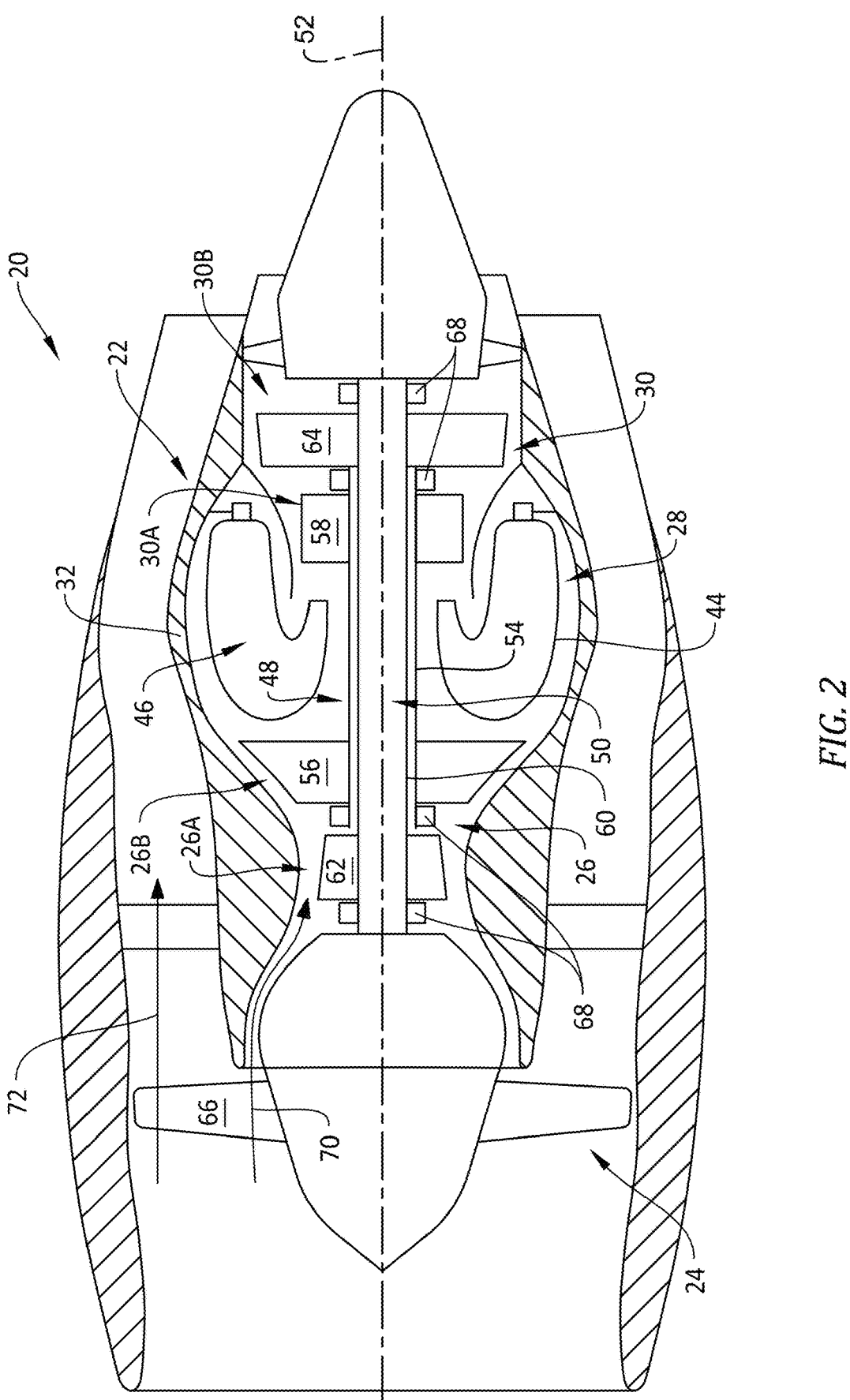
FIG. 2 schematically illustrates a cutaway, side view of an aircraft propulsion system, in accordance with one or more embodiments of the present disclosure.

FIG. 2 schematically illustrates a cutaway, side view of the propulsion system 20. The propulsion system 20 of FIG. 2 includes a gas turbine engine 22. The gas turbine engine 22 of FIG. 2 is configured as a turbofan gas turbine engine. However, while the following description and accompanying drawings may refer to the turbofan gas turbine engine 22 of FIG. 2 as an example, it should be understood that aspects of the present disclosure may be equally applicable to other types of gas turbine engines including, but not limited to, a turboshaft gas turbine engine, a turboprop gas turbine engine, a turbojet gas turbine engine, a propfan gas turbine engine, or an open rotor gas turbine engine. Aspects of the present disclosure may be equally applicable to aircraft propulsion systems including other engine configurations such as, but not limited to, rotary engines, piston engines, and the like, or to electric aircraft propulsion systems (e.g., battery-electric propulsion systems, fuel-cell-electric propulsion systems, etc.). Aspects of the present disclosure may also be equally applicable to aircraft engines which are not part of a propulsion system, for example, an engine for an auxiliary power unit (APU).

The gas turbine engine 22 of FIG. 2 includes a fan section 24, a compressor section 26, a combustor section 28, a turbine section 30, and an engine static structure 32. The compressor section 26 includes a low-pressure compressor 26A and a high-pressure compressor 26B. The combustor section 28 includes a combustor 44 (e.g., an annular combustor) surrounding and forming a combustion chamber 46. The turbine section 30 of FIG. 2 includes a high-pressure turbine 30A and a low-pressure turbine 30B.

Components of the fan section 24, the compressor section 26, and the turbine section 30 form a first rotational assembly 48 (e.g., a high-pressure spool) and a second rotational assembly 50 (e.g., a low-pressure spool) of the gas turbine engine 22. The first rotational assembly 48 and the second rotational assembly 50 are mounted for rotation about a rotational axis 52 (e.g., an axial centerline) of the gas turbine engine 22 relative to the engine static structure 32.

The first rotational assembly 48 includes a first shaft 54, a bladed first compressor rotor 56 for the high-pressure compressor 26B, and a bladed first turbine rotor 58 for the high-pressure turbine 30A. The first shaft 54 interconnects the bladed first compressor rotor 56 and the bladed first turbine rotor 58.

The second rotational assembly 50 includes a second shaft 60, a bladed second compressor rotor 62 for the low-pressure compressor 26A, a bladed second turbine rotor 64 for the low-pressure turbine 30B, and a bladed fan rotor 66 for the fan section 24. The second shaft 60 of FIG. 2 interconnects the bladed second compressor rotor 62, the bladed second turbine rotor 64, and the bladed fan rotor 66. The second shaft 60 may alternatively be connected to the bladed fan rotor 66 through a gear train configured, for example, to drive the bladed fan rotor 66 at a reduced rotational speed relative to the second shaft 60.

The engine static structure 32 includes one or more engine cases, cowlings, inner fixed structures, and/or other non-rotating structures configured to house and/or support components of the gas turbine engine sections 24, 26, 28, 30. The engine static structure 32 further includes a plurality of bearing assemblies 68 configured to rotationally support the first rotational assembly 48 (e.g., the first shaft 54) and the second rotational assembly 50 (e.g., the second shaft 60).

In operation of the gas turbine engine 22 of FIG. 2, ambient air is directed through the fan section 24 and into a core flow path 70 (e.g., an annular flow path) and a bypass flow path 72 (e.g., an annular flow path) by rotation of the bladed fan rotor 66. Airflow along the core flow path 70 is compressed by the low-pressure compressor 26A and the high-pressure compressor 26B. The compressed air from the compressor section 26 is mixed and burned with fuel in the combustor 44 (e.g., the combustion chamber 46). Combustion gas from the combustor 44 is directed along the core flow path 70 through the high-pressure turbine 30A and the low-pressure turbine 30B. The bladed first turbine rotor 58 and the bladed second turbine rotor 64 rotationally drive the first rotational assembly 48 and the second rotational assembly 50, respectively, in response to the combustion gas flow through the high-pressure turbine 30A and the low-pressure turbine 30B. The bypass flow path 72 may be disposed outside the engine static structure 32. For example, the engine static structure 32 and an outer aircraft propulsion system housing (e.g., a nacelle) may form an annular bypass duct radially therebetween, and airflow may be directed through the annular bypass duct along the bypass flow path 72.

Figure 3:
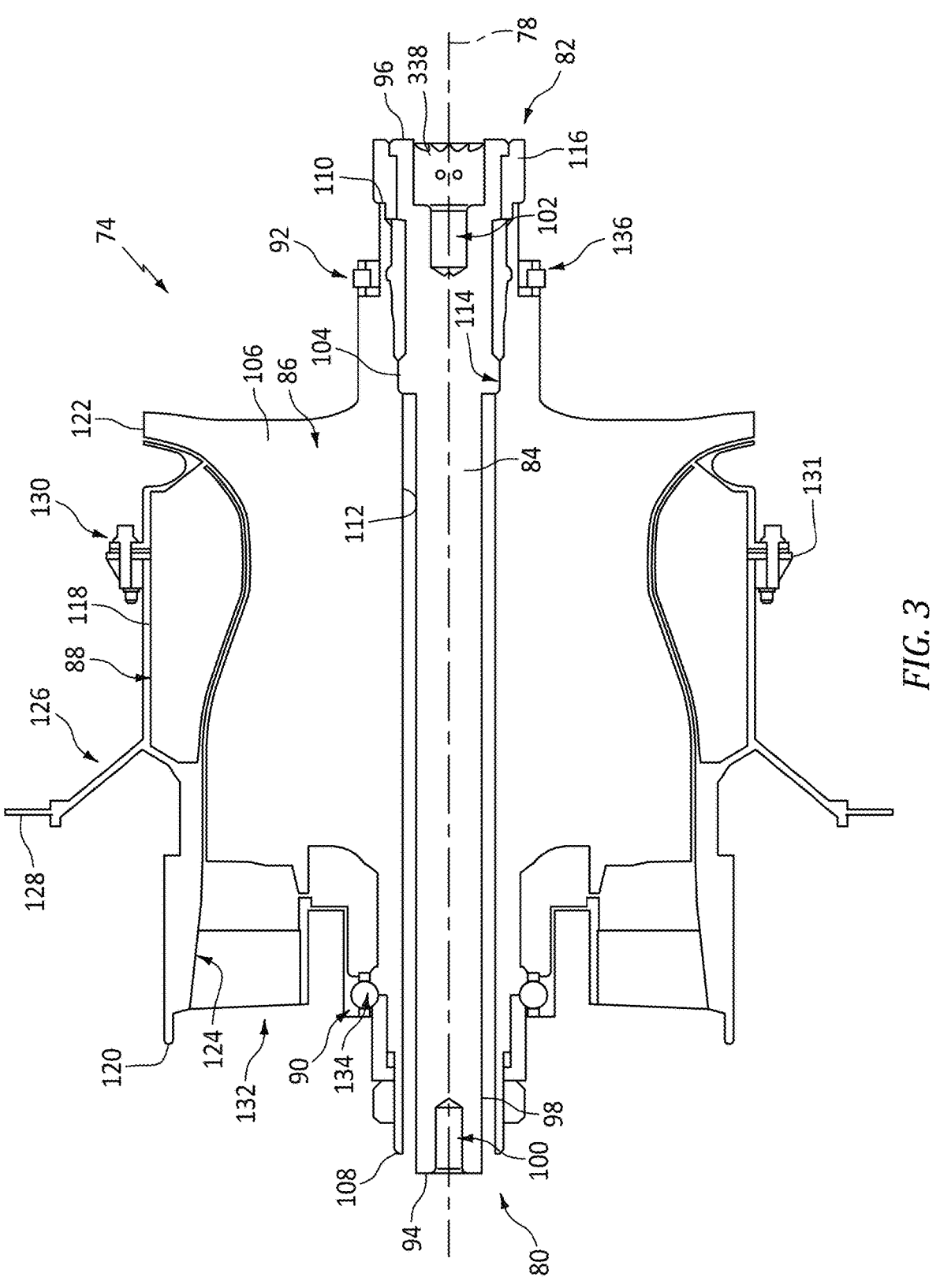
FIG. 3 schematically illustrates a cutaway, side view of a rotational equipment module for an aircraft propulsion system, in accordance with one or more embodiments of the present disclosure.
Figure 4:
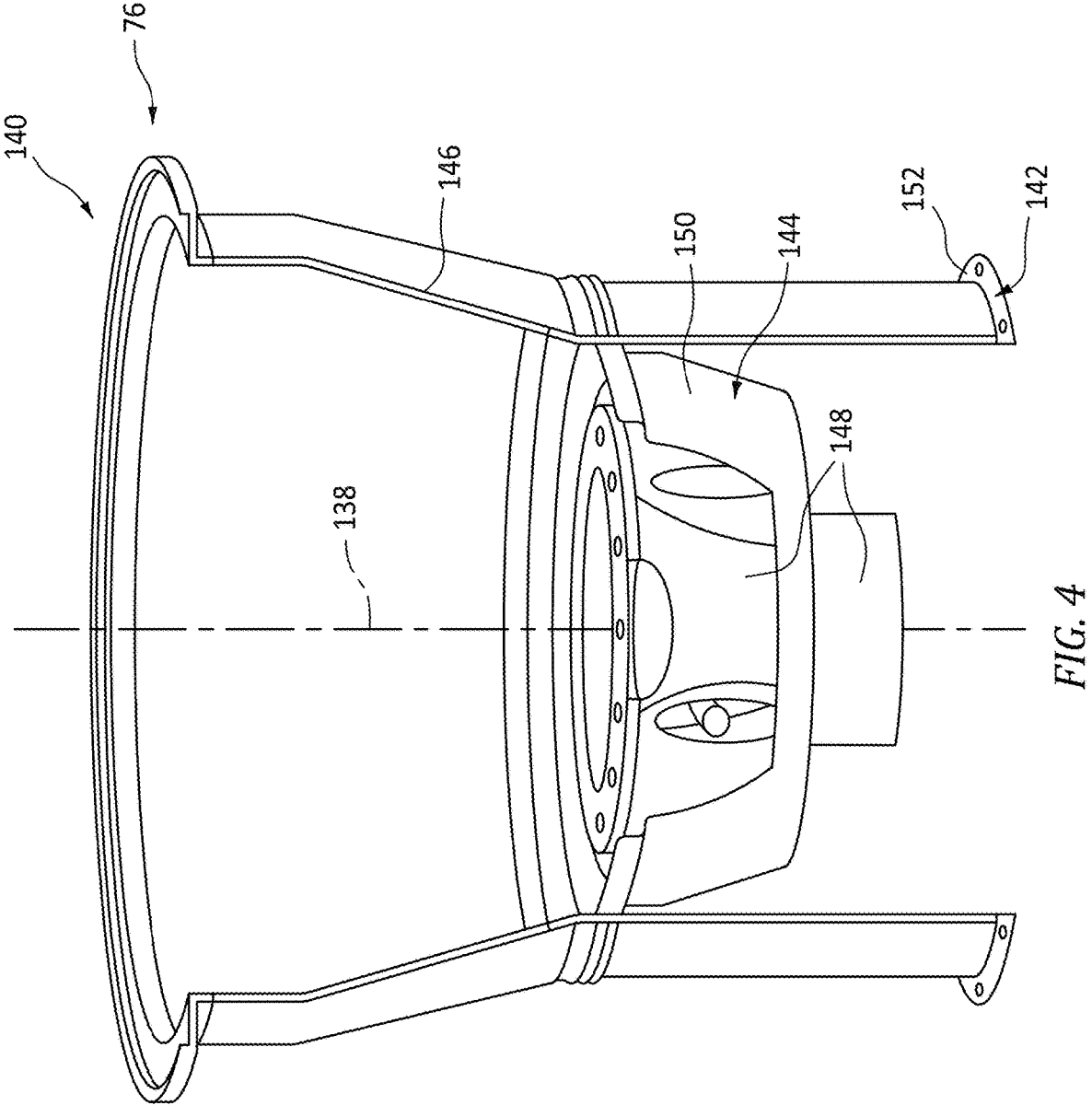
FIG. 4 schematically illustrates a cutaway, side view of a rotational equipment case configured for assembly with the rotational equipment module of FIG. 3, in accordance with one or more embodiments of the present disclosure.

FIGS. 3 and 4 illustrate exemplary components rotational equipment assembly in an unassembled state. The rotational equipment assembly includes a rotational equipment module having a stator assembly and a rotor assembly rotatable within and relative to the stator assembly. The rotational equipment assembly further includes a rotational equipment case (e.g., an engine static structure 32 component; see FIG. 2) configured to attach to the stator assembly. In particular, FIGS. 3 and 4 illustrate a rotational equipment assembly for a turbomachine compressor section, such as, but not limited to, the compressor section 26 (see FIG. 2). The present disclosure, however, is not limited to compressor rotational equipment assemblies. FIG. 3 illustrates a cutaway, side view of a compressor module 74 for a gas turbine engine such as, but not limited to, the gas turbine engine 22. For example, the compressor module 74 may be configured to form the high-pressure compressor 26B of the gas turbine engine 22 (i.e., the compressor module 74 may be a high-pressure compressor module). FIG. 4 illustrates a partial cutaway, perspective view of a compressor case 76 configured for assembly with the compressor module 74 to form a portion of the compressor section 26. The compressor case 76 of FIG. 4 is configured as an intermediate compressor case (ICC). This intermediate compressor case may form a portion of the engine static structure 32 (see FIG. 2) interconnecting compressor modules (e.g., the low-pressure compressor 26A and the high-pressure compressor 26B) of the gas turbine engine 22 and forming portions of the core flow path 70 therebetween. The compressor case 76 of the present disclosure, however, is not limited to intermediate compressor case configurations and may be any discrete engine static structure case configured for assembly with a compressor module, such as the compressor module 74.

The compressor module 74 of FIG. 3 extends along an axis 78 (e.g., a rotational axis, a centerline axis, etc.) between and to a first axial end 80 of the compressor module 74 and a second axial end 82 of the compressor module 74. The compressor module 74 includes a tooling shaft 84, a rotor assembly 86, a stator assembly 88. The compressor module 74 may additionally include a first bearing assembly 90 and/or a second bearing assembly 92 as shown, for example, in FIG. 3.

The tooling shaft 84 extends on and along the axis 78 between and to the first axial end 80 and the second axial end 82. In particular, the tooling shaft 84 extends along the axis 78 between and to a first axial end 94 of the tooling shaft 84 (e.g., at the first axial end 80) and a second axial end 96 of the tooling shaft 84 (e.g., at the second axial end 82). The tooling shaft 84 has an outer radial side 98 extending between and to the first axial end 94 and the second axial end 96. The tooling shaft 84 forms a first threaded aperture 100 on the first axial end 94. The tooling shaft 84 forms a second threaded aperture 102 on the second axial end 96. The tooling shaft 84 forms a threaded interface 104 on a portion of the outer radial side 98 axially between the first axial end 94 and the second axial end 96.

The rotor assembly 86 forms a bladed compressor rotor 106 (e.g., the bladed first compressor rotor 56; see FIG. 2). The bladed compressor rotor 106 may be formed by a plurality of discrete rotor bodies assembled (e.g., fixedly mounted) together. Alternatively, the bladed compressor rotor 106 may be formed by a single rotor body. The rotor assembly 86 may additionally form portions of a rotational assembly shaft such as, but not limited to, the first shaft 54

(see FIG. 1). The bladed compressor rotor 106 extends along the axis 78 between and to a first axial end 108 of the bladed compressor rotor 106 (e.g., at the first axial end 80) and a second axial end 110 of the bladed compressor rotor 106 (e.g., at the second axial end 82). The bladed compressor rotor 106 has an inner radial side 112 extending between and to the first axial end 108 and the second axial end 110. The inner radial side 112 circumscribes the tooling shaft 84. The bladed compressor rotor 106 is fixedly mounted (e.g., axially and rotationally fixed) on the tooling shaft 84. The bladed compressor rotor 106 forms a threaded interface 114 on a portion of the inner radial side 112 axially between the first axial end 108 and the second axial end 110. The threaded interface 114 is engaged with the threaded interface 104. In combination with the engagement between the threaded interfaces 104, 114, the bladed compressor rotor 106 may be axially fixed on the tooling shaft 84 by, for example, a nut 116 installed on (e.g., threaded on) the tooling shaft 84 at (e.g., on, adjacent, or proximate) the second axial end 96 and axially abutting the second axial end 110.

The stator assembly 88 forms a compressor case 118 for the compressor module 74. The compressor case 118 may be formed by a plurality of discrete case bodies assembled (e.g., fixedly mounted) together. Alternatively, the compressor case 118 may be formed by a single case body. The compressor case 118 extends along the axis 78 between and to a first axial end 120 of the compressor case 118 (e.g., proximate the first axial end 80) and a second axial end 122 of the compressor case 118 (e.g., proximate the second axial end 82). The compressor case 118 has an inner radial side 124 and an outer radial side 126. The inner radial side 124 and the outer radial side 126 extend between and to the first axial end 120 and the second axial end 122. The inner radial side 124 circumscribes the bladed compressor rotor 106. The compressor case 118 of FIG. 3 includes a first flange 128 and a second flange 130 at (e.g., on, adjacent, or proximate) the outer radial side 126. The second flange 130 may include a plurality of radially-extending circumferential segments 131 circumferentially distributed about the axis 78. The stator assembly 88 may additionally include vanes (e.g., stator vanes, variable vanes, etc.), struts, and/or other structural bodies supporting and housing components of the compressor module 74. For example, the stator assembly 88 of FIG. 3 includes an inlet vane assembly 132 supporting the first bearing assembly 90.

The first bearing assembly 90 is mounted (e.g., on the stator assembly 88) and engaged with the rotor assembly 86 to rotationally support the rotor assembly 86 (e.g., for rotation about the axis 78 relative to the stator assembly 88). The first bearing assembly 90 of FIG. 3 includes a ball bearing 134; however, the present disclosure is not limited to any particular bearing configuration of the bearings of the first bearing assembly 90. Similarly, the second bearing assembly 92 is mounted on and engaged with the rotor assembly 86 to rotationally support the rotor assembly 86, for example, at (e.g., on, adjacent, or proximate) the second axial end 110. The second bearing assembly 92 of the compressor module 74 of FIG. 3 is not mounted to or otherwise supported by a static structure (e.g., the stator assembly 88). The second bearing assembly 92 of FIG. 3 includes a roller bearing 136; however, the present disclosure is not limited to any particular bearing configuration of the bearings of the second bearing assembly 92.

The compressor case 76 of FIG. 4 extends circumferentially about (e.g., completely around) an axis 138. The compressor case 76 extends along the axis 138 between and to a first axial end 140 of the compressor case 76 and a second axial end 142 of the compressor case 76. The compressor case 76 includes an inner case body 144 (e.g., an inner radial case body) and an outer case body 146 (e.g., an outer radial case body). The inner case body 144 forms a portion of the core flow path 70 through the compressor section 26, for example, between the low-pressure compressor 26A and the high-pressure compressor 26B (see FIG. 2). The inner case body 144 of FIG. 4 includes an inner wall 148 and an outer wall 150 forming the core flow path 70 radially therebetween. The inner wall 148 and the outer wall 150 may be mounted together, for example, by a plurality of circumferentially distributed struts of the inner case body 144 extending therebetween. The inner case body 144 (e.g., the inner wall 148 and the outer wall 150) may be disposed axially between and spaced from the first axial end 140 and the second axial end 142 as shown, for example, in FIG. 4. The inner case body 144 is mounted to the outer case body 146. The outer case body 146 circumscribes the inner case body 144 and forms a radial exterior of the compressor case 76. The outer case body 146 may form or otherwise be disposed at (e.g., on, adjacent, or proximate) the bypass flow path 72 (see FIG. 2). The outer case body 146 includes a flange 152 at (e.g., on, adjacent, or proximate) the second axial end 142.

Figure 8:
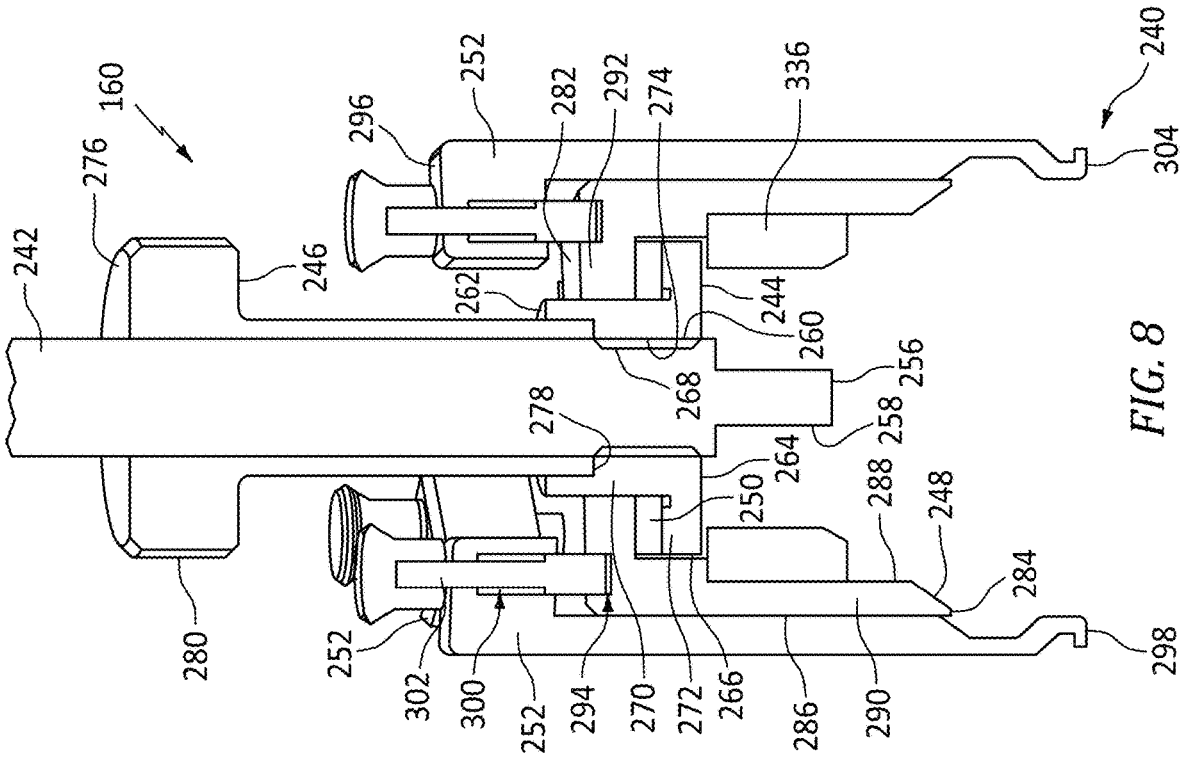
FIG. 8 illustrates a cutaway, perspective view of a portion of the pulling rod assembly of FIG. 7, in accordance with one or more embodiments of the present disclosure.
Figure 7:
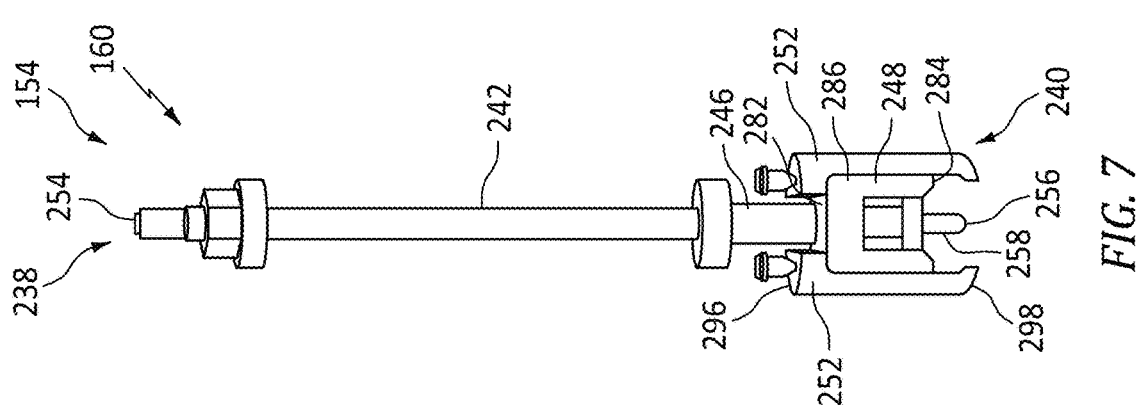
FIG. 7 illustrates a perspective view of a pulling rod assembly for assembling the rotational equipment module and the rotational equipment case together, in accordance with one or more embodiments of the present disclosure.

Referring to FIGS. 5-8, the present disclosure includes an assembly system 154. The assembly system 154, as described herein, may be particularly useful for facilitating assembly of the compressor module 74 and the compressor case 76 together (see FIGS. 3-4). However, the present disclosure assembly system 154 is not limited to use with the particular compressor module 74 and compressor case 76 described above. The assembly system 154 includes a first support assembly 156 (FIG. 5), a second support assembly 158 (FIG. 6), and a pulling rod assembly 160 (FIGS. 7-8).

The first support assembly 156 extends along an axis 162 of the first support assembly 156 between and to an upper axial end 164 of the first support assembly 156 and a lower axial end 166 of the first support assembly 156. The terms "upper" and "lower," as used herein, may refer to a typical vertical orientation of the assembly system 154 during use (e.g., to assemble the compressor module 74 and the compressor case 76; see FIGS. 3-4) and should not be considered otherwise limiting. The first support assembly 156 includes an upper support member 168, a frame 170, and a lower support member 172.

The upper support member 168 is disposed at and forms the upper axial end 164. The upper support member 168 includes a support ring portion 174 and a mounting portion 176. The support ring portion 174 extends circumferentially about (e.g., completely around) the axis 162. The mounting portion 176 projects radially outward from the support ring portion 174. The mounting portion 176 is configured for attachment to a supporting structure (not shown) to support (e.g., suspend) the first support assembly 156 from the supporting structure. The upper support member 168 may additionally include one or more clamps 177 selectively attachable on the support ring portion 174 at (e.g., on, adjacent, or proximate) the upper axial end 164.

The frame 170 includes a side wall portion 178 and an end wall portion 180. The side wall portion 178 and the end wall portion 180 extend circumferentially about (e.g., completely around) the axis 162. The side wall portion 178 extends (e.g., radially extends) between and connects the support ring portion 174 and the end wall portion 180. The side wall portion 178 of FIG. 5 forms a plurality of grooves 182 extending radially through the side wall portion 178 proximate the end wall portion 180 (e.g., at a lower axial end of the side wall portion 178). The grooves 182 may be circumferentially distributed about the axis 162. The end wall portion 180 includes an outer ring 184, an inner ring 186, and a plurality of arms 188. The outer ring 184 is mounted to or otherwise disposed on the side wall portion 178. The inner ring 186 is disposed radially within and spaced from the outer ring 184. The arms 188 extend radially between and connect the outer ring 184 and the inner ring 186. The arms 188 are circumferentially distributed about the axis 162 to form a plurality of circumferential slots 190. Each of the circumferential slots 190 formed between circumferentially adjacent arms 188, the outer ring 184, and the inner ring 186.

Figure 5:
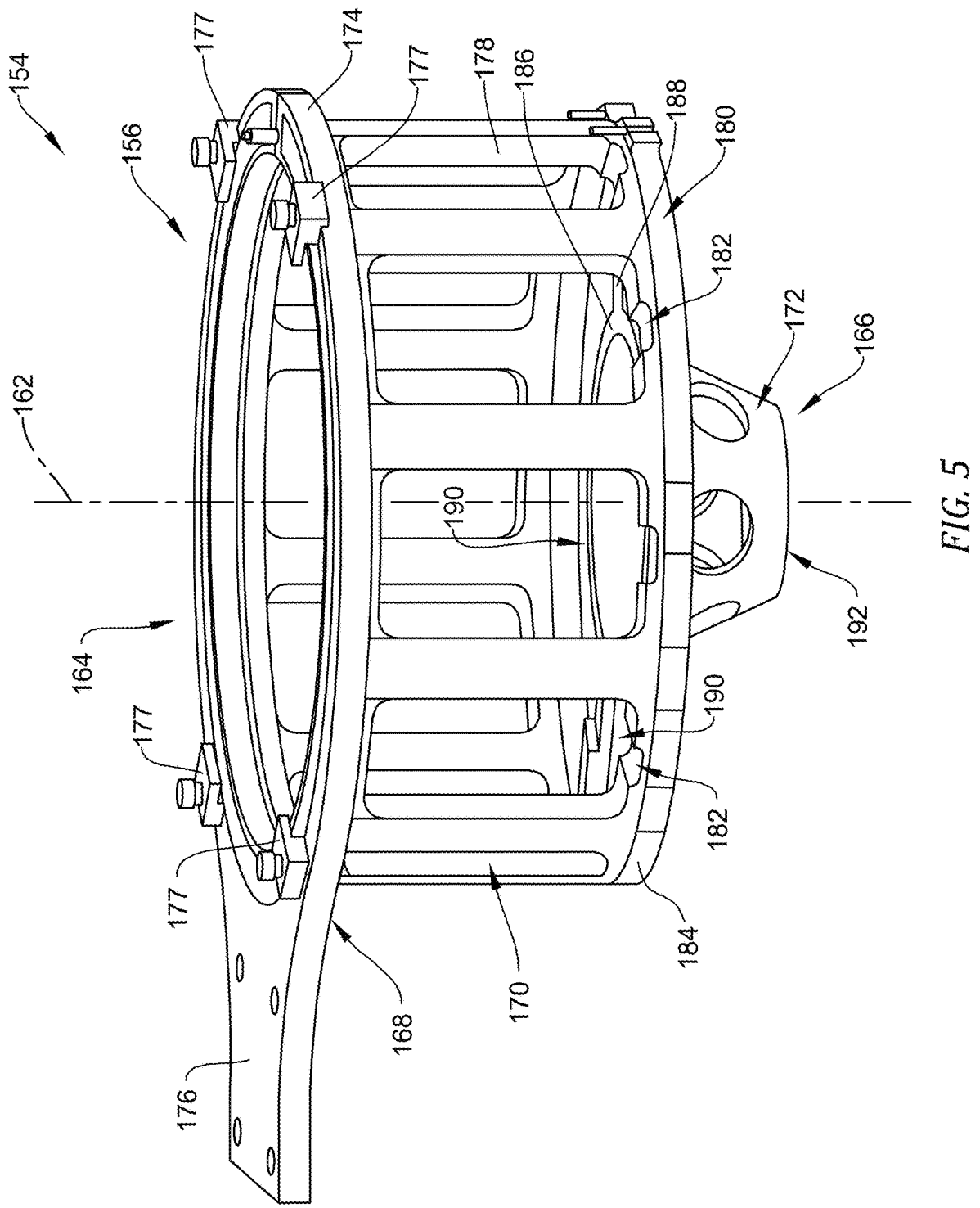
FIG. 5 illustrates a perspective view of a first support assembly for assembling the rotational equipment module and the rotational equipment case together, in accordance with one or more embodiments of the present disclosure.
Figure 6:
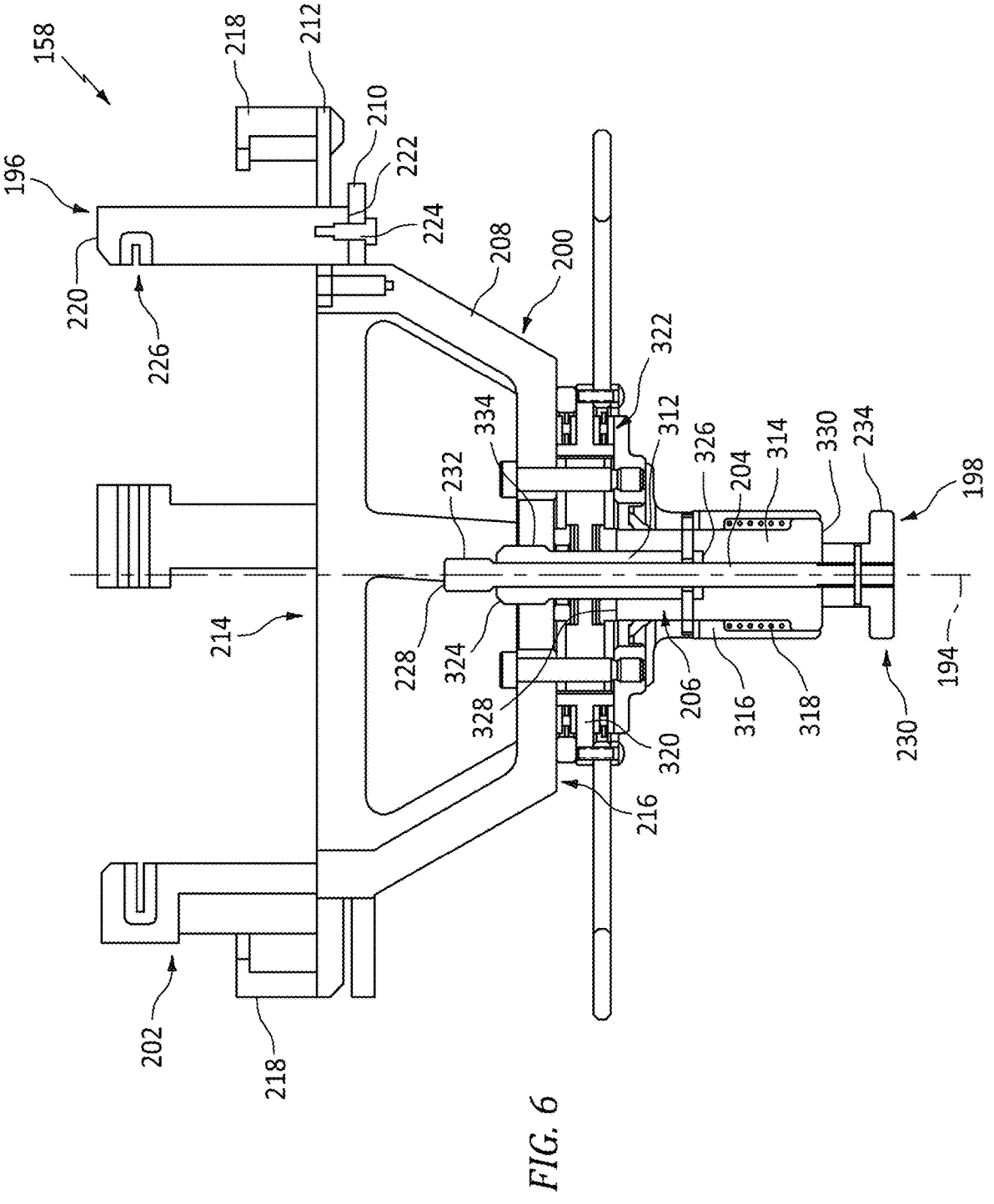
FIG. 6 illustrates a cutaway, side view of a second support assembly for assembling the rotational equipment module and the rotational equipment case together, in accordance with one or more embodiments of the present disclosure.

The lower support member 172 is disposed at and forms the lower axial end 166. The lower support member 172 is mounted to or otherwise disposed on the inner ring 186. The lower support member 172 extends circumferentially about (e.g., completely around) the axis 162. The lower support member 172 forms a rotor opening 192 extending axially therethrough. As shown in FIG. 5, the lower support member 172 may have a conical frustum shape having a diameter which converges in an axial direction from the inner ring 186 to the lower axial end 166.

The second support assembly 158 extends along an axis 194 of the second support assembly 158 between and to an upper axial end 196 of the second support assembly 158 and a lower axial end 198 of the second support assembly 158. The second support assembly 158 includes a frame 200, a plurality of flange arms 202, a coupling shaft 204, and an adjustment assembly 206.

The frame 200 includes a frame body 208, an inner ring 210, and an outer ring 212. The frame body 208, the inner ring 210, and the outer ring 212 extend circumferentially about the axis 194. The frame body 208 extends along the axis 194 between and to an upper axial end 214 and a lower axial end 216. The lower axial end 216 is mounted to or otherwise disposed at (e.g., on, adjacent, or proximate) the adjustment assembly 206. The frame body 208 may have a conical frustum shape having a diameter which diverges in an axial direction from the lower axial end 216 to the upper axial end 214. The inner ring 210 is mounted to and circumscribes the frame body 208 at (e.g., on, adjacent, or proximate) the upper axial end 214. The outer ring 212 is mounted to and circumscribes the inner ring 210. The frame 200 may additionally include one or more circumferential retaining members 218 selectively attachable on the outer ring 212. The retaining members 218 may be sized to securely fit within a respective one of the slots 190 (see FIG. 5).

Each of the flange arms 202 extends between and to an upper axial end 220 and a lower axial end 222. Each of the flange arms 202 is selectively attachable to the inner ring 210 on the lower axial end 222, for example, by installation of a locking pin 224 through the inner ring 210 and into the respective one of the flange arms 202. Installed on the inner ring 210, the flange arms 202 extend axially between and to the inner ring 210 and the upper axial end 196 (e.g., with the upper axial end 214 at the upper axial end 196). Each of the flange arms 202 includes a slot 226 at (e.g., on, adjacent, or proximate) upper axial end 220. With the flange arms 202 installed on the inner ring 210, the slot 226 faces radially inward toward the axis 194. The slot 226 is sized to securely retain the second flange 130 (see FIG. 3) therein. The flange arms 202 (e.g., five flange arms) may be circumferentially distributed on the inner ring 210 about the axis 194.

The coupling shaft 204 extends on and along the axis 194 between and to an upper axial end 228 of the coupling shaft 204 and a lower axial end 230 of the coupling shaft 204. The upper axial end 228 is disposed within the frame body 208 and axially spaced from (e.g., above) the adjustment assembly 206. The coupling shaft 204 forms a threaded interface 232 at (e.g., on, adjacent, or proximate) the upper axial end 228. The threaded interface 232 is configured to engage (e.g., thread with) the tooling shaft 84 within the second threaded aperture 102 (see FIG. 3). The lower axial end 230 forms the lower axial end 198 and is axially spaced from (e.g., below) the adjustment assembly 206. The coupling shaft 204 may include a handle 234 at (e.g., on, adjacent, or proximate) the lower axial end 198.

The adjustment assembly 206 includes an outer shaft 312, a shaft link 314, a housing 316, a spring 318, an adjustment member 320, and a thrust bearing 322. The outer shaft 312 extends along the axis 194 between and to an upper axial end 324 of the outer shaft 312 and a lower axial end 326 of the outer shaft 312. The outer shaft 312 is disposed on and extends circumferentially about the coupling shaft 204 from the upper axial end 324 to the lower axial end 326. The outer shaft 312 is rotatable on and about the coupling shaft 204. The outer shaft 312 may include a splined interface 334 at (e.g., on, adjacent, or proximate) the upper axial end 324 or another mechanical interface configured to rotationally fix the outer shaft 312 relative to the tooling shaft 84. For example, the splined interface 334 may be engaged with a counterpart splined interface 338 of the tooling shaft 84 at the second axial end 96 and/or the second threaded aperture 102 (see FIG. 3). The shaft link 314 extends along the axis 194 between and to an upper axial end 328 of the shaft link 314 and a lower axial end 330 of the shaft link 314. The shaft link 314 is disposed on and extends circumferentially about the outer shaft 312 at (e.g., on, adjacent, or proximate) the upper axial end 328. The shaft link 314 is disposed on and extends circumferentially about the coupling shaft 204 at (e.g., on, adjacent, or proximate) the lower axial end 330. The lower axial end 330 is disposed at (e.g., on, adjacent, or proximate) the handle 234. The housing 316 is disposed on and extends circumferentially about the shaft link 314. The spring 318 is disposed axially between and contacting the shaft link 314 and the housing 316. The spring 318 is configured to bias the shaft link 314 axially downward (e.g., toward the handle 234). The adjustment member 320 is fixed to the frame 200 and configured to rotate with the frame 200 about the axis 194. The adjustment member 320 may include an adjustment handle 332 configured to facilitate rotation of the frame 200. The thrust bearing 322 extends circumferentially about (e.g., completely around) the axis 194. The thrust bearing 322 is disposed on the outer shaft 312 and engaged with the adjustment member 320. The thrust bearing 322 facilitates rotation of the adjustment member 320 about the axis 194 to rotationally position the frame 200 and the flange arms 202.

The pulling rod assembly 160 extends along an axis 236 of the pulling rod assembly 160 between and to an upper axial end 238 of the pulling rod assembly 160 and a lower axial end 240 of the pulling rod assembly 160. The pulling rod assembly 160 includes a coupling shaft 242, a positioning nut 244, an adjustment shaft 246, a frame 248, a thrust bearing 250, and a plurality of finger links 252. The pulling rod assembly 160 may additionally include a sleeve 336.

The coupling shaft 242 extends on and along the axis 236 between and to an upper axial end 254 of the coupling shaft 242 and a lower axial end 256 of the coupling shaft 242. The coupling shaft 242 includes a first threaded interface 258 and a second threaded interface 260. The first threaded interface 258 is disposed at (e.g., on, adjacent, or proximate) the lower axial end 256. The first threaded interface 258 is configured to engage (e.g., thread with) the tooling shaft 84 within the first threaded aperture 100 (see FIG. 3). The second threaded interface 260 is disposed axially between the first threaded interface 258 and the upper axial end 254 but, as shown in FIG. 8, in close proximity to the first threaded interface 258.

The positioning nut 244 extends circumferentially about (e.g., completely around) the axis 236 and the coupling shaft 242. The positioning nut 244 extends between and to an upper axial end 262 of the positioning nut 244 and a lower axial end 264 of the positioning nut 244. The positioning nut 244 extends between and to an outer radial end 266 of the positioning nut 244 and an inner radial end 268 of the positioning nut 244. The positioning nut 244 includes an axial body portion 270 and a radial body portion 272. The axial body portion 270 extends along and forms the inner radial end 268 from the upper axial end 262 to the lower axial end 264. The axial body portion 270 forms a threaded interface 274 on the inner radial end 268. The threaded interface 274 is configured to engage (e.g., thread with) the second threaded interface 260. The radial body portion 272 radially extends (e.g., projects outward) from the axial body portion 270 to the outer radial end 266 along the lower axial end 264.

The adjustment shaft 246 extends circumferentially about (e.g., completely around) the axis 236 and the coupling shaft 242. The adjustment shaft 246 extends along the axis 236 between and to an upper axial end 276 of the adjustment shaft 246 and a lower axial end 278 of the adjustment shaft 246. The adjustment shaft 246 includes an adjustment head 280 at (e.g., on, adjacent, or proximate) the upper axial end 276. The adjustment shaft 246 is mounted to the positioning nut 244 (e.g., the upper axial end 262) at (e.g., on, adjacent, or proximate) the lower axial end 278. The adjustment shaft 246 is configured for rotation about the coupling shaft 242 (e.g., by operation of the adjustment head 280) to drive rotation of the positioning nut 244, and thereby change an axial position of the positioning nut 244 on the coupling shaft 242 (e.g., by operation of the engaged threaded interfaces 260, 274).

The frame 248 extends circumferentially about (e.g., completely around) the axis 236 and the coupling shaft 242. The frame 248 extends between and to an upper axial end 282 of the frame 248 and a lower axial end 284 of the frame 248. The frame 248 extends between and to an outer radial end 286 of the frame 248 and an inner radial end 288 of the frame 248. The frame 248 includes an axial body portion 290 and a radial body portion 292. The axial body portion 290 extends along and forms the outer radial end 286 from the upper axial end 282 to the lower axial end 284. The radial body portion 292 radially extends (e.g., projects inward) from the axial body portion 290 to the inner radial end 288 along the upper axial end 282. The radial body portion 292 is disposed at (e.g., on, adjacent, or proximate) the positioning nut 244 (e.g., the axial body portion 270). The radial body portion 292 is disposed radially coincident with the radial body portion 272. The frame 248 may form a plurality of locking pin aperture 294 on the upper axial end 282.

The thrust bearing 250 extends circumferentially about (e.g., completely around) the axis 236. The thrust bearing 250 is disposed radially between the positioning nut 244 (e.g., the axial body portion 270) and the frame 248 (e.g., the axial body portion 290). The thrust bearing 250 is disposed axially between and engaged with the positioning nut 244 (e.g., the radial body portion 272) and the frame 248 (e.g., the radial body portion 292). The thrust bearing 250 facilitates relative rotation between the positioning nut 244 and the frame 248 such that positioning nut 244 may be rotated on the coupling shaft 242 to axially position the positioning nut 244 (e.g., by operation of the engaged threaded interfaces 260, 274) without applying a (substantial) rotational force to the frame 248. This thrust bearing 250 further facilitates axial positioning of the frame 248 by adjusting the axial position of the positioning nut 244 on the coupling shaft 242 (e.g., the positioning nut 244 may operate to move the frame 248 axially upward or downward).

The finger links 252 are selectively attachable on the frame 248 (e.g., along the outer radial end 286). The pulling rod assembly 160 of FIGS. 7 and 8 includes four finger links 252; however, the present disclosure is not limited to any particular quantity of the finger links 252. Each of the finger links 252 extends (e.g., axially extends) between and to an upper axial end 296 of the finger links 252 and a lower axial end 298 of the finger links 252. Each of the finger links 252 forms a locking pin aperture 300 extending axially through the finger links 252 at (e.g., on, adjacent, or proximate) the upper axial end 282. As shown in FIG. 8, for example, each of the finger links 252 may be attached onto the frame 248 using a locking pin 302 extending though the locking pin aperture 300 and a respective one of the locking pin apertures 294 of the frame 248. The locking pin 302 may be captively mounted on the finger links 252 and/or biased (e.g., spring biased) into a downward extended position. The present disclosure, however, is not limited to this foregoing exemplary configuration of the locking pin 302. Each of the finger links 252 forms a hook 304 at (e.g., on, adjacent, or proximate) the lower axial end 298.

The pulling rod assembly 160 may additionally include the sleeve 336. The sleeve 336 may extend circumferentially about (e.g., completely around) the axis 236. The sleeve 336 may be mounted within the frame 248 at (e.g., on, adjacent, or proximate) the inner radial end 288, for example, by friction fit or other suitable mechanical attachment. The sleeve 336 may facilitate coupling of the pulling rod assembly 160 with the rotor assembly 86 and the first bearing assembly 90 (see FIG. 3).

Figure 9:
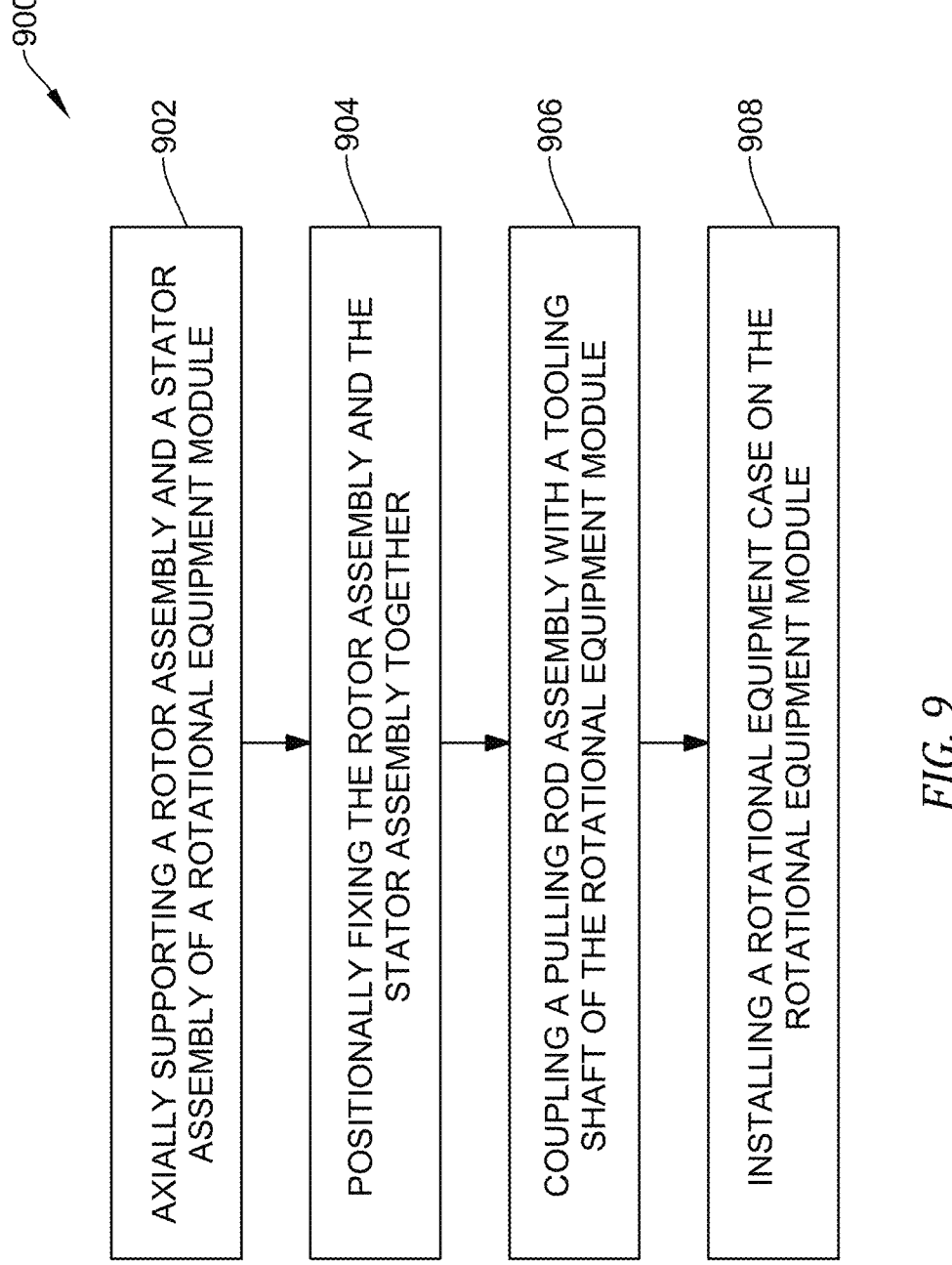
FIG. 9 illustrates a block diagram depicting a method for assembling a rotational equipment assembly for an aircraft propulsion system, in accordance with one or more embodiments of the present disclosure.

Referring to FIGS. 9-15, a method 900 for assembling components of rotational equipment is provided. FIG. 9 illustrates a flowchart of the method 900. For ease of description, the method 900 is described below with reference to operation of the assembly system 154 to assemble the compressor module 74 and the compressor case 76 together for installation in the gas turbine engine 22. However, the method 900 is not limited to performance with the particular assembly system 154, compressor module 74, and compressor case 76 described above and herein.

Figure 10:
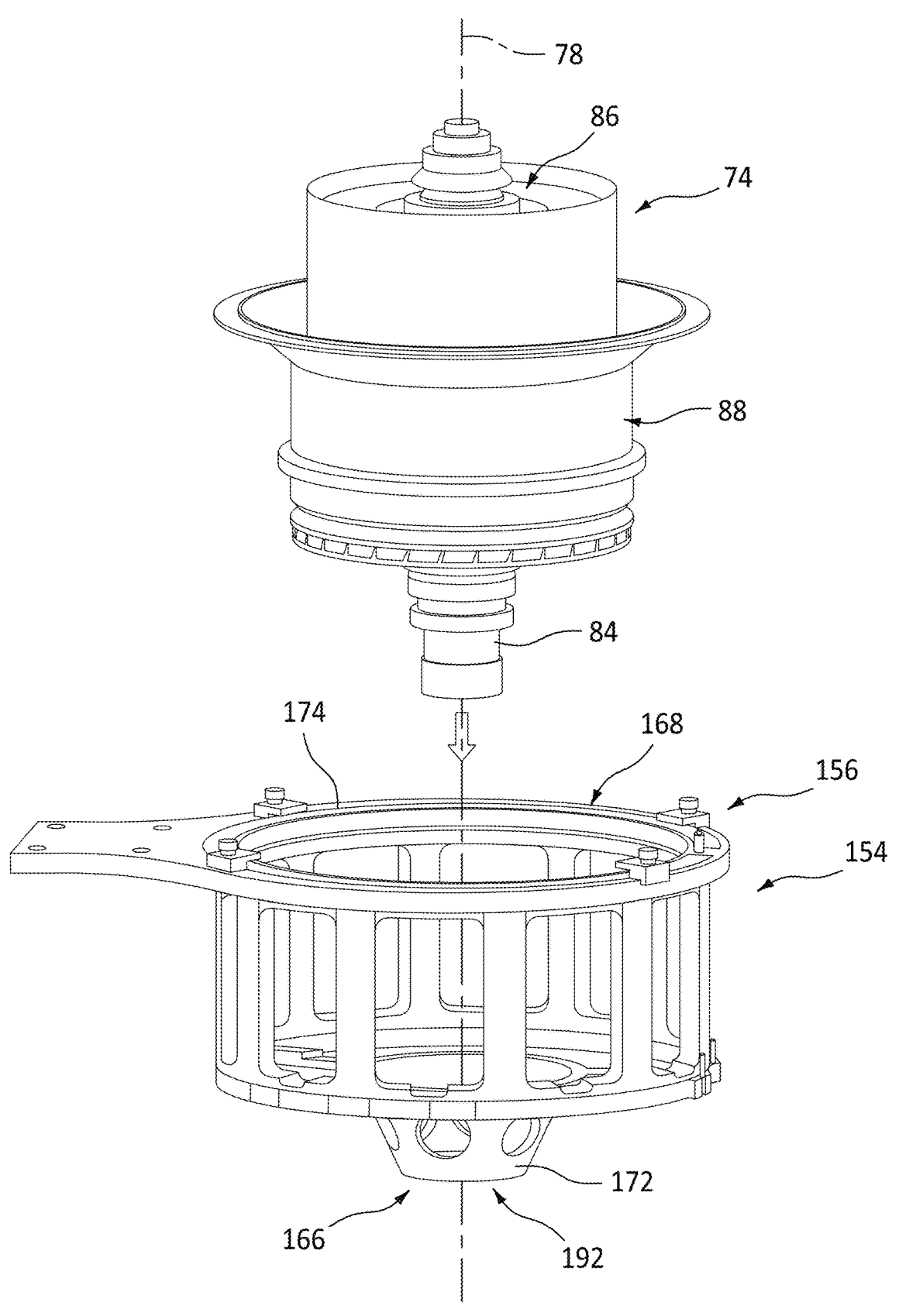
FIG. 10 schematically illustrates a perspective view of the rotational equipment module and the first support assembly for a portion of the method of FIG. 9, in accordance with one or more embodiments of the present disclosure.
Figure 11:
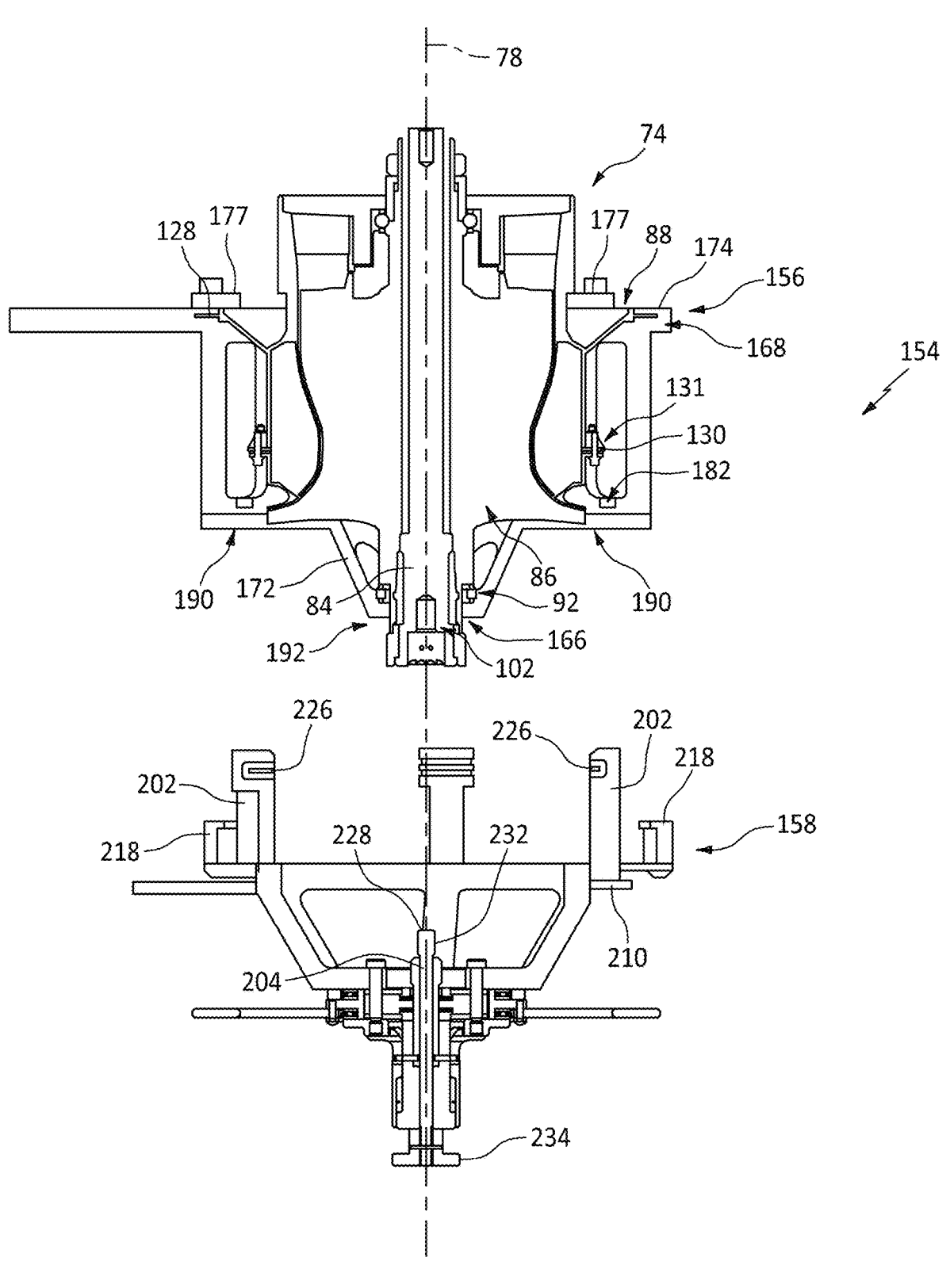
FIG. 11 schematically illustrates a perspective view of the rotational equipment module, the first support assembly, and the second support assembly for another portion of the method of FIG. 9, in accordance with one or more embodiments of the present disclosure.

Step 902 includes axially supporting the rotor assembly 86 and the stator assembly 88. Step 902 may include axially fixing (or substantially fixing) the rotor assembly 86 relative to the stator assembly 88 with respect to the axis 78 of the compressor module 74. As shown in FIGS. 10 and 11, the compressor module 74 may be axially lowered into the first support assembly 156 until the rotor assembly 86 and the stator assembly 88 are seated (e.g., axially seated) on the first support assembly 156. The rotor assembly 86 may be seated on the lower support member 172, for example, at (e.g., on, adjacent, or proximate) the lower axial end 166. As shown in FIG. 11, for example, the second bearing assembly 92 may be seated on the lower support member 172. In this seated position of the rotor assembly 86, portions of the tooling shaft 84 and the rotor assembly 86 may extend axially through the rotor opening 192. The stator assembly 88 may be seated on the upper support member 168, for example, on the support ring portion 174. As shown in FIG. 11, for example, the first flange 128 may be seated on the support ring portion 174. The clamps 177 may be attached onto the support ring portion 174 with the first flange 128 securely positioned axially between the support ring portion 174 and the clamps 177. The rotor assembly 86 and the stator assembly 88 are supported by the first support assembly 156 (e.g., the upper support member 168 and the lower support member 172) at a predetermined axial distance (e.g., formed by the first support assembly 156) to prevent clashing between the rotor assembly 86 and the stator assembly 88 while seated in the first support assembly 156.

Figure 12:
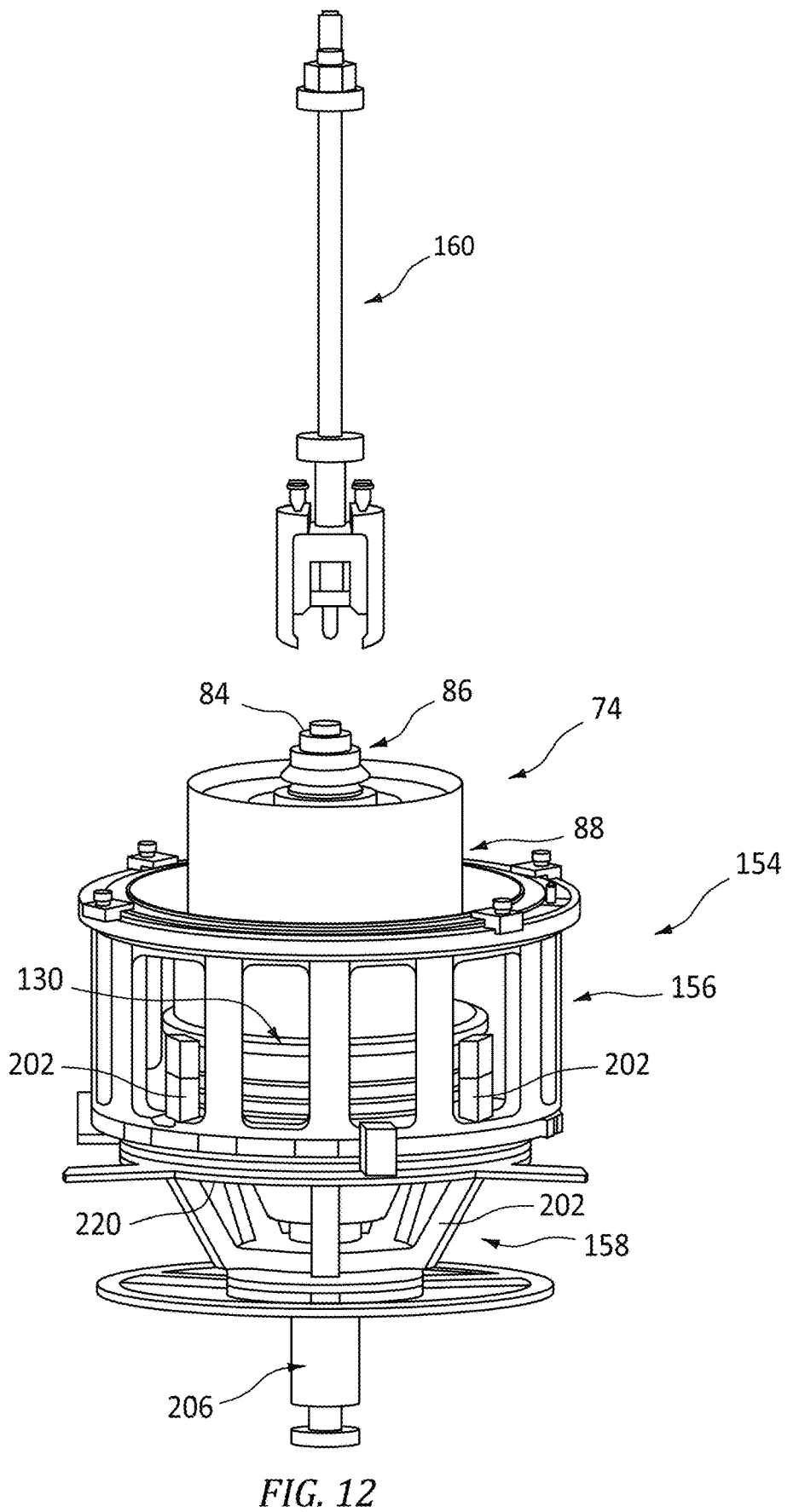
FIG. 12 schematically illustrates a perspective view of the rotational equipment module, the first support assembly, the second support assembly, and the pulling rod assembly for another portion of the method of FIG. 9, in accordance with one or more embodiments of the present disclosure.

Step 904 includes positionally fixing the rotor assembly 86 and the stator assembly 88 together. Step 904 may include positionally fixing (e.g., axially and rotationally fixing) the rotor assembly 86 relative to the stator assembly 88. As shown in FIGS. 11 and 12, and with additional reference to FIG. 6, the second support assembly 158 may be installed onto the compressor module 74 and the first support assembly 156 in their assembled state (e.g., subsequent to step 902). The second support assembly 158 may be axially raised until the coupling shaft 204 (e.g., the upper axial end 228) contacts the tooling shaft 84 at the second threaded aperture 102. The coupling shaft 204 may be rotated (e.g., by operation of the handle 234) to engage (e.g., thread) the threaded interface 232 with the second threaded aperture 102, thereby axially fixing the second support assembly 158 on the compressor module 74. This rotation and threading of the threaded interface 232 with the second threaded aperture 102 additionally moves the splined interface 334 into engaged with the splined interface 338 of the tooling shaft 84, thereby rotationally fixing the outer shaft 312 (and the shaft link 314 and the housing 316) to the tooling shaft 84. As the second support assembly 158 is axially raised and engaged with the tooling shaft 84, the flange arms 202 may be oriented to extend axially through the circumferential slots 190. The second support assembly 158 may be axially positioned with the slot 226 of each of each of the flange arms 202 axially aligned with the second flange 130. The frame 200 and its inner and outer rings 210, 212 may be rotated by operation of the adjustment assembly 206 to position a respective one of the radially-extending circumferential segments 131 of the second flange 130 within the slot 226 of each of the flange arms 202. Each of the circumferential retaining members 218 may be positioned within one of the grooves 182 and attached onto the outer ring 184 to circumferentially fix (or substantially circumferentially fix) the rotor assembly 86 to the stator assembly 88 through the second support assembly 158. In this installed condition of the first support assembly 156 and the second support assembly 158 on the compressor module 74, no or substantially no relative movement between the rotor assembly 86 and the stator assembly 88 is permitted.

Figure 13:
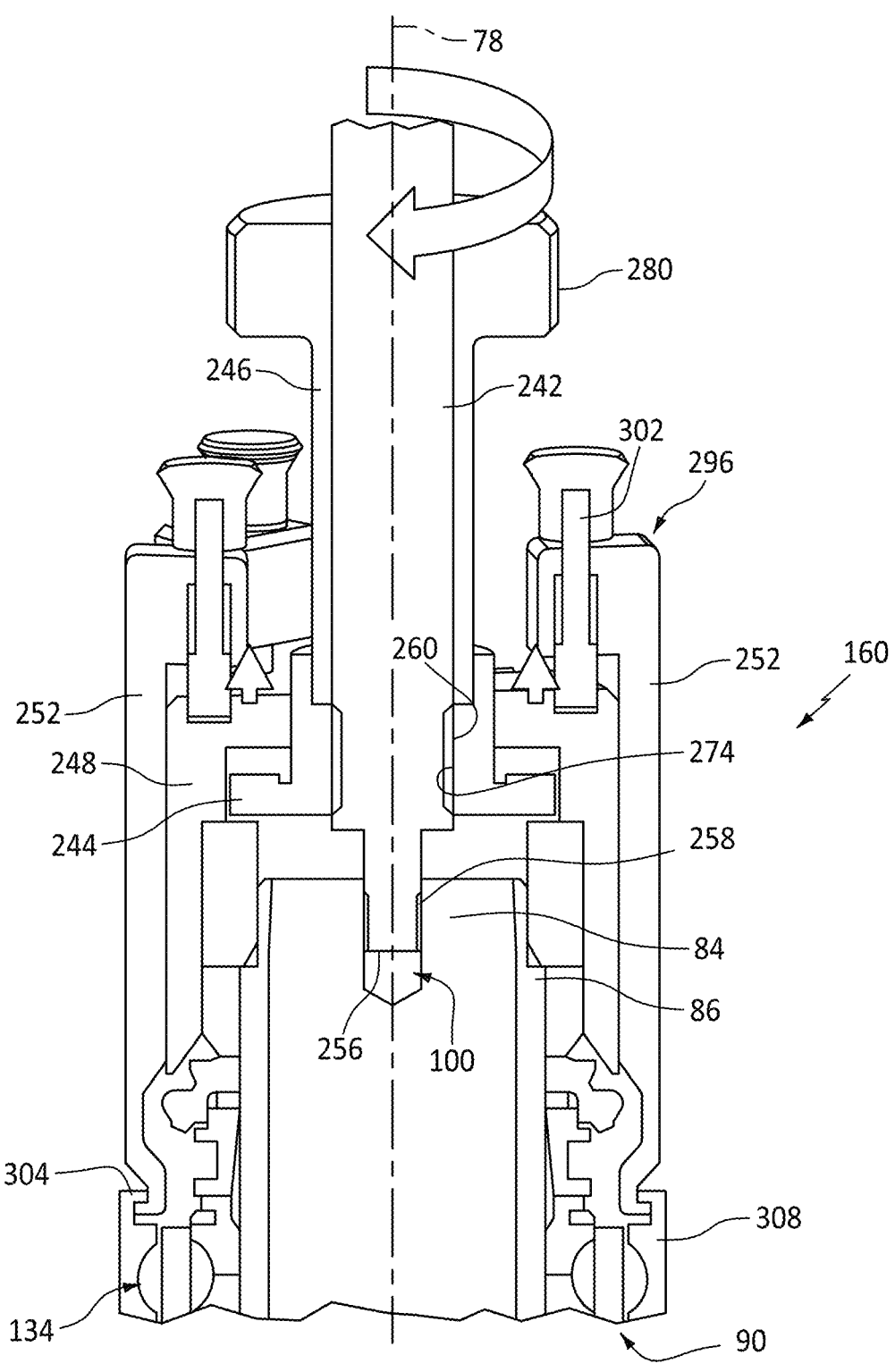
FIG. 13 illustrates a cutaway, perspective view of a portion of the pulling rod assembly for another portion of the method of FIG. 9, in accordance with one or more embodiments of the present disclosure.

Step 906 includes coupling the pulling rod assembly 160 with the tooling shaft 84 and/or the rotor assembly 86. Step 906 may additionally include supporting the first bearing assembly 90, as shown in FIG. 13. For example, step 906 may include supporting the ball bearing 134 to ensure the ball elements 306 are not exposed to substantial axial loading in subsequent assembly steps of the method 900). The ball elements 306 may be lightly loaded (e.g., in an axially upward direction) by axially constraining an outer race 308 of the ball bearing 134. The pulling rod assembly 160 may be installed onto the tooling shaft 84 and the rotor assembly 86 at the first axial end 80. The pulling rod assembly 160 may be axially lowered until the coupling shaft 242 (e.g., the lower axial end 256) contacts the tooling shaft 84 at the first threaded aperture 100. The coupling shaft 242 may be rotated to engage (e.g., thread) the first threaded interface 258 with the tooling shaft 84 at the first threaded aperture 100. The hook 304 of each of the finger links 252 may be engaged with the outer race 308 at a groove, a hook, or another attachment feature of the outer race 308. With the hook 304 engaged with the outer race 308, each of the finger links 252 is pivoted by moving (e.g., pushing) the finger links 252 (e.g., the upper axial end 296) radially inward. Each of the finger links 252 may then be fixed on the frame 248 by operation of the locking pin 302. With each of the finger links 252 engaged with the outer race 308 and attached (e.g., locked) onto the frame 248, the adjustment shaft 246 may be rotated (e.g., by hand operation of the adjustment head 280) to raise the positioning nut 244 through threaded engagement of the second threaded interface 260 with the threaded interface 274, thereby axially lifting (e.g., constraining) the outer race 308.

Figure 14:
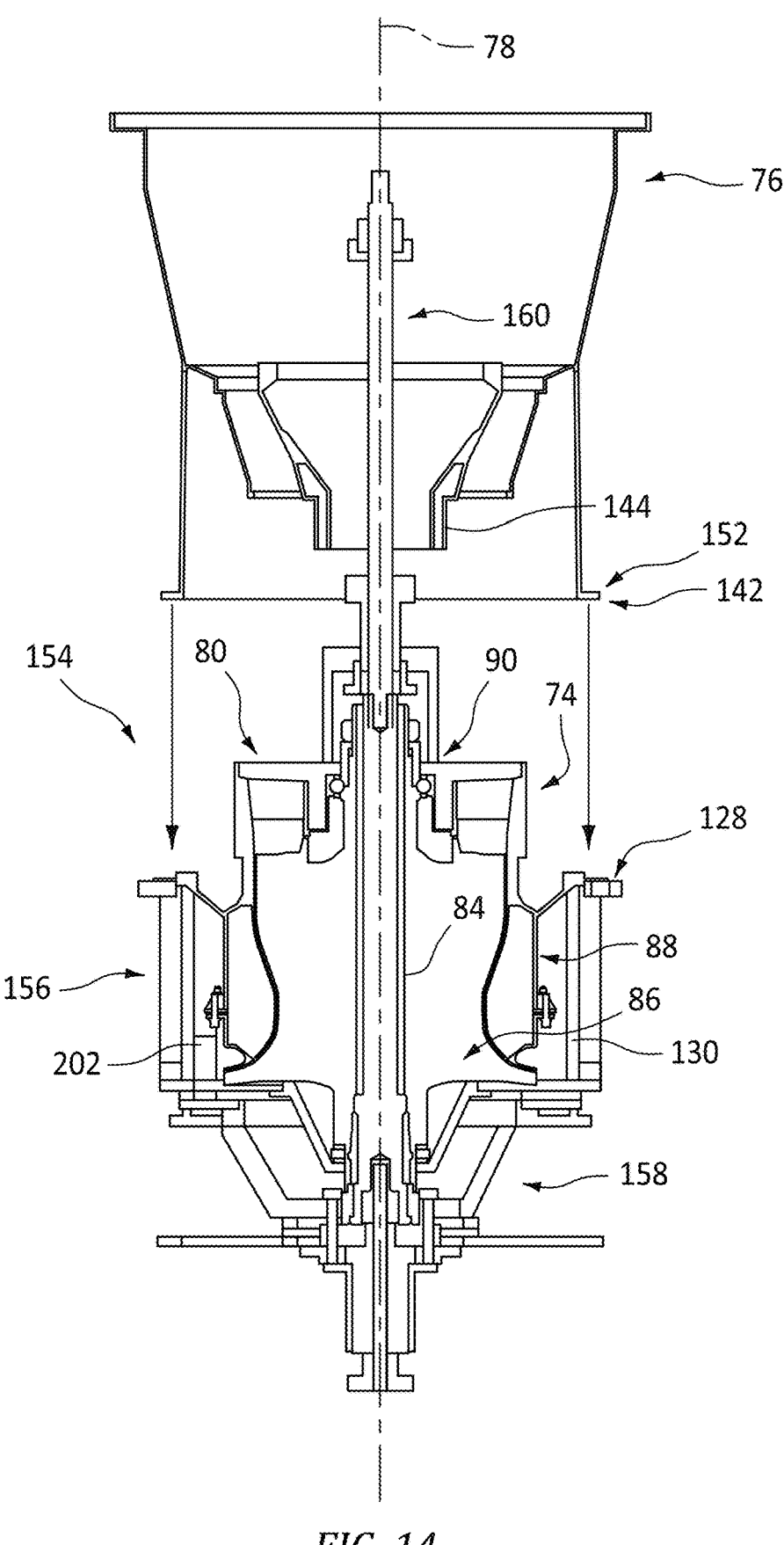
FIG. 14 schematically illustrates a cutaway, perspective view of the rotational equipment module and the rotational equipment case for another portion of the method of FIG. 9, in accordance with one or more embodiments of the present disclosure.
Figure 15:
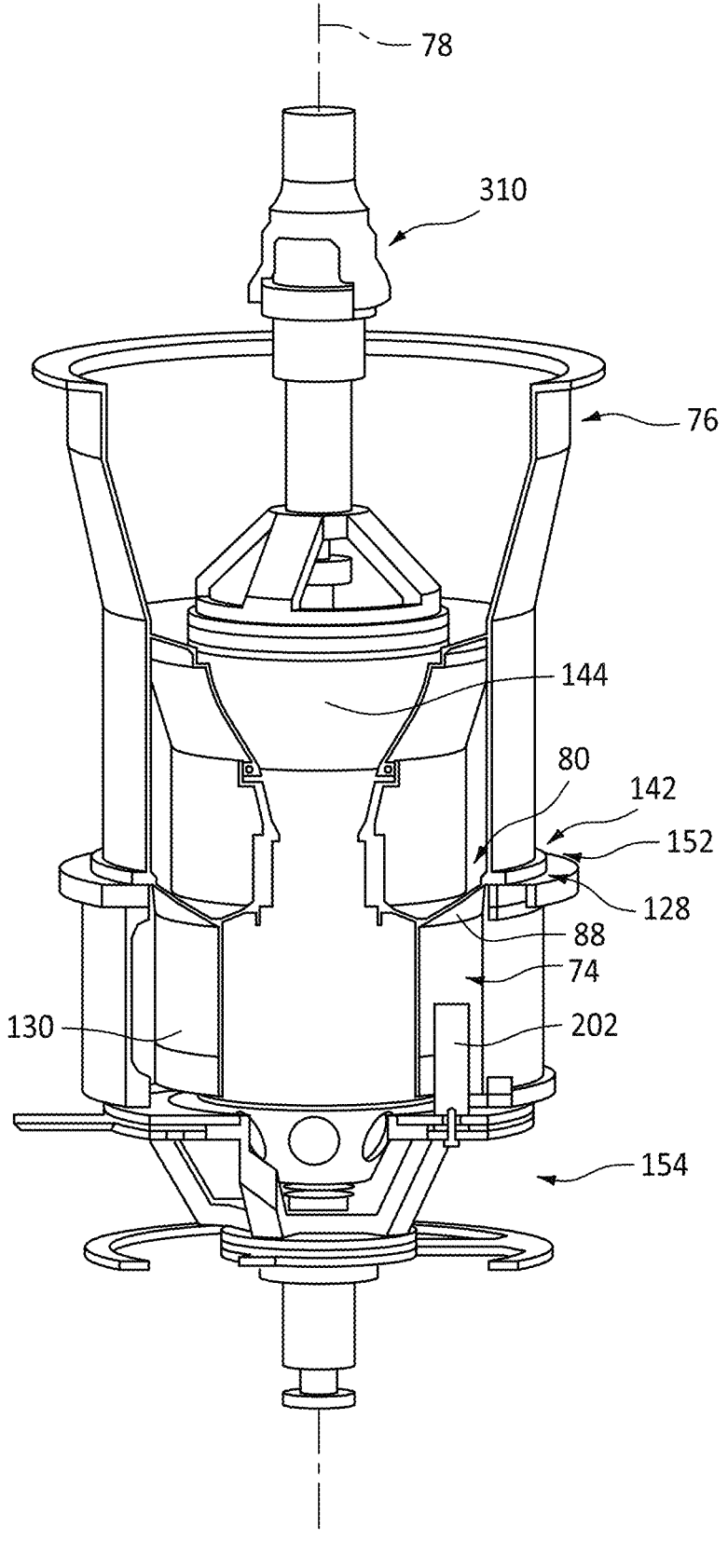
FIG. 15 schematically illustrates a cutaway, perspective view of the rotational equipment module and the rotational equipment case for another portion of the method of FIG. 9, in accordance with one or more embodiments of the present disclosure.

Step 908 includes installing the compressor case 76 on the compressor module 74. As shown in FIGS. 14 and 15, the compressor case 76 may be lowered onto the compressor module 74 with the second axial end 80 lowered axially toward and past the first axial end 80 such that the flange 152 is disposed at (e.g., on, adjacent, or proximate) the first flange 128. For example, the flange 152 may be positioned axially abutting (or nearly abutting) the first flange 128. The compressor case 76, disposed at the compressor module 74, circumscribes the pulling rod assembly 160 and an axial portion of the compressor module 74. The inner case body 144 may be disposed at (e.g., on, adjacent, or proximate) and circumscribing the first bearing assembly 90. As shown in FIG. 15, hydraulic pressure may be applied to the assembly of the compressor module 74 and the compressor case 76 in the axial direction to tightly fit the compressor module 74 and the compressor case 76 together. For example, the hydraulic pressure may be applied on the compressor module 74 and the compressor case 76 by a hydraulic assembly 310. The hydraulic assembly 310 of FIG. 15 is engaged with the pulling rod assembly 160 and the compressor case 76 (e.g., the inner case body 144).

In a first assembly step, the hydraulic assembly 310 may be operated to pull the pulling rod assembly 160 in an axially upward direction while holding the compressor case 76 axially fixed (or substantially axially fixed) to pull the compressor module 74 axially upward toward the compressor case 76. This operation of the hydraulic assembly 310 may close axial gaps and tightly fit the stator assembly 88 relative to the compressor case 76 and, particularly, at the interface of the flange 152 and the first flange 128. The rotor assembly 86 may move axially with the stator assembly 88 as a result of the engagement of the first support assembly 156 with the rotor assembly 86 and the stator assembly 88 (see step 902).

In a second assembly step, the flange arms 202 of the second support assembly 158 are decoupled from the second flange 130 to facilitate axial movement of the rotor assembly 86 (e.g., in the upward axial direction) relative to the compressor case 76 and the stator assembly 88. The hydraulic assembly 310 may be operated to pull the pulling rod assembly 160 in an axially upward direction while holding the compressor case 76 axially fixed (or substantially axially fixed) to pull the rotor assembly 86 axially upward toward the compressor case 76. This movement of the rotor assembly 86 further pulls the first bearing assembly 90 upward into tightly fitted engagement with the compressor case 76 (e.g., the inner case body 144).

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A method for assembling a rotational equipment assembly for an aircraft propulsion system, the rotational equipment assembly including a rotational equipment module and a rotational equipment case, the method comprising:

axially supporting the rotational equipment module along an axis of the rotational equipment module with a first support assembly, the rotational equipment module including a tooling shaft, a rotor assembly, and a stator assembly, the rotor assembly mounted on the tooling shaft, the stator assembly circumscribing the rotor assembly, the rotor assembly and the stator assembly seated on the first support assembly;

positionally fixing the rotor assembly and the stator assembly together with a second support assembly with the rotor assembly and the stator assembly axially supported by the first support assembly, the second support assembly mounted on the tooling shaft at a first axial end of the tooling shaft;

coupling a pulling rod assembly with the tooling shaft at a second axial end of the tooling shaft; and assembling the rotational equipment assembly by positioning the rotational equipment case axially abutting the rotational equipment module and axially pulling the pulling rod assembly to axially fit the rotational equipment module with the rotational equipment case.

2. The method of claim 1, wherein axially supporting the rotational equipment module includes lowering the rotational equipment module into the first support assembly along the axis until the rotor assembly and the stator assembly are seated on the first support assembly.

3. The method of claim 1, wherein the first support assembly includes an upper support member and a lower support member, each of the upper support member and the lower support member extends circumferentially about the axis, and with the rotor assembly and the stator assembly seated on the first support assembly the rotor assembly is seated on the lower support member and the stator assembly is seated on the upper support member.

4. The method of claim 1, wherein positionally fixing the rotor assembly and the stator assembly together with the second support assembly includes axially fixing the stator assembly to the tooling shaft with the second support assembly.

5. The method of claim 1, wherein positionally fixing the rotor assembly and the stator assembly together with the second support assembly includes rotationally fixing the second support assembly to the first support assembly.

6. The method of claim 1, wherein coupling the pulling rod assembly with the tooling shaft at the second axial end includes axially fixing a coupling shaft of the pulling rod assembly to the tooling shaft at the second axial end.

7. The method of claim 1, wherein coupling the pulling rod assembly with the tooling shaft at the second axial end includes coupling the pulling rod assembly with an outer race of a bearing of the rotational equipment module.

* * * * *